United States Patent
Saeedi et al.

(10) Patent No.: US 11,930,168 B2
(45) Date of Patent: Mar. 12, 2024

(54) CONSISTENT ADJUSTMENT OF PARAMETERS FOR VIDEO ENCODING

(71) Applicant: ATI TECHNOLOGIES ULC, Markham (CA)

(72) Inventors: Mehdi Saeedi, Markham (CA); Boris Ivanovic, Markham (CA)

(73) Assignee: ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 16/147,052

(22) Filed: Sep. 28, 2018

(65) Prior Publication Data
US 2020/0107019 A1  Apr. 2, 2020

(51) Int. Cl.
| H04N 19/117 | (2014.01) |
| G06T 5/00   | (2006.01) |
| G06T 5/50   | (2006.01) |
| H04N 19/124 | (2014.01) |
| H04N 19/176 | (2014.01) |
| H04N 19/196 | (2014.01) |

(52) U.S. Cl.
CPC ............ *H04N 19/117* (2014.11); *G06T 5/002* (2013.01); *G06T 5/50* (2013.01); *H04N 19/124* (2014.11); *H04N 19/176* (2014.11); *H04N 19/196* (2014.11); *G06T 2207/20216* (2013.01)

(58) Field of Classification Search
CPC .. H04N 19/117; H04N 19/124; H04N 19/176; H04N 19/196; G06T 5/002; G06T 5/50; G06T 2207/20216
See application file for complete search history.

(56) References Cited

U.S. PATENT DOCUMENTS

| 2014/0341290 A1* | 11/2014 | Merkle | H04N 19/52 375/240.16 |
| 2015/0373327 A1* | 12/2015 | Zhang | H04N 19/176 375/240.03 |
| 2018/0220129 A1* | 8/2018 | Peng | H04N 19/117 |

* cited by examiner

*Primary Examiner* — Joseph W Becker (57) ABSTRACT

An encoder calculates a first local encoding parameter for a first block of video content based on one or more local metrics. The encoder modifies the first local encoding parameter based on one or more second local encoding parameters for one or more second blocks of video content that are adjacent to the first block of video content. The encoder then encodes the first block using the modified first local encoding parameter. In some cases, the local encoding parameters are quantization parameters used to quantize values of pixels or compression parameters used to compress values of the pixels. The local metric can include one or more of a target bit rate, a texture complexity, a contrast, an indicator of motion in the first block, and an importance map.

20 Claims, 8 Drawing Sheets

CONSISTENT ADJUSTMENT OF PARAMETERS FOR VIDEO ENCODING

BACKGROUND

Video content generated by a processing unit (such as a graphics processing unit, GPU) includes a sequence of frames. For the purpose of video encoding, each frame is usually subdivided into blocks of pixels such as 16 pixel×16 pixel blocks, or blocks of other sizes that may change across the image, which are referred to herein as macroblocks. Pixels in the blocks are transformed and quantized during encoding. The encoded stream can be transformed for a display, which decodes the encoded stream using a decoding process that reconstructs the pixels. A transform such as a discrete cosine transform (DCT) is commonly used to calculate the frequency components of the pixels during the encoding process. The resulting frequency domain data are referred to as coefficients. Quantizing the data (e.g., the coefficients) includes dividing (or scaling) the data in the blocks by a scaling matrix, which typically results in the loss of some high-frequency details in the transformed data. The scaling matrix is typically defined by a quantization parameter. Values of the quantization parameter used in an encoder that operates according to a specified codec, such as the H.264 codec, range from 0 to 51. Encoding pixels with different values of the quantization parameter results in different amounts of information being lost once the data is quantized. For example, using quantization parameter of 1 retains most of the information and throws out a relatively small amount of details. For another example, encoding with quantization parameter of 51 throws out a relatively large amount of details. In general, the amount of information lost during the encoding increases from low losses with low quantization parameter values to high losses with high values of the quantization parameter.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

An encoding parameter such as a quantization parameter applied to a block is conventionally determined based on budget, encode history, and in some cases the characteristics of the block. In some cases, the quantization parameter is determined based on a target bit rate or metrics that indicate complexity of the textures used to render the block, a range of contrasts between pixels in the block, motion within the image, and the like. Other techniques use an emphasis map or an importance map to highlight important blocks that are assigned correspondingly higher or lower quantization parameters based on the importance (perceptual or other type of importance) of the blocks. However, setting the quantization parameter based only on local characteristics of the block results in visual artifacts that are readily detectable by a user viewing video content that is reconstructed from the quantized data after decoding. For example, if a highly textured portion of an image (such as hair) extends over multiple blocks, selecting different quantization parameters to scale the data in the different blocks creates inconsistencies between the rendered image associated with the different blocks, which produces a noticeable difference in the appearance of the image in the different blocks. For another example, if the quantization parameter of a highly textured portion of an image in a block changes from frame to frame, the image in the block appears to fluctuate, a visual artifact that is referred to as "shimmering" or "boiling."

FIGS. 1-5 disclose techniques that reduce or eliminate visual artifacts in video content by selecting encoding parameters for blocks in frames of the video content based on encoding parameters selected for temporally or spatially adjacent blocks. In some embodiments, the encoding parameters are quantization parameters, although other encoding parameters such as compression parameters can be filtered in a similar manner. Local quantization parameters are generated for blocks in a frame based on target bit rates or local metrics such as texture complexities, contrasts, motion, importance maps, and the like. Values of the local quantization parameters are modified based on values of temporally or spatially adjacent blocks to form the filtered quantization parameters that are used to quantize the blocks. In some embodiments, temporal filtering is used to determine filtered quantization parameters for blocks in a current frame based on the filtered quantization parameters for corresponding blocks in one or more previous frames. For example, a local quantization parameter for a block and a current frame can be filtered using infinite impulse response (IIR) filtering, finite impulse response (FIR) filtering, 2-tap filtering, 4-tap filtering, and the like. In some embodiments, spatial filtering is used to determine the filtered quantization parameters for a block in a current frame based on a local quantization parameter for the block and local quantization parameters for neighboring blocks within the frame. For example, the filtered quantization parameters for blocks in a frame can be determined by applying a box filter, a Gaussian blur filter, and the like to other blocks in the frame within a predetermined locality. Spatial and temporal filtering are combined in some embodiments. The filtering parameters or the type of filtering applied to the quantization parameters of the blocks in a frame are dynamically selected or modified in response to scene changes or changes in the characteristics of the images. The changes in characteristics can be local to a frame (such as different objects in a frame) or over multiple frames (such as within a scene change).

Figure 1:
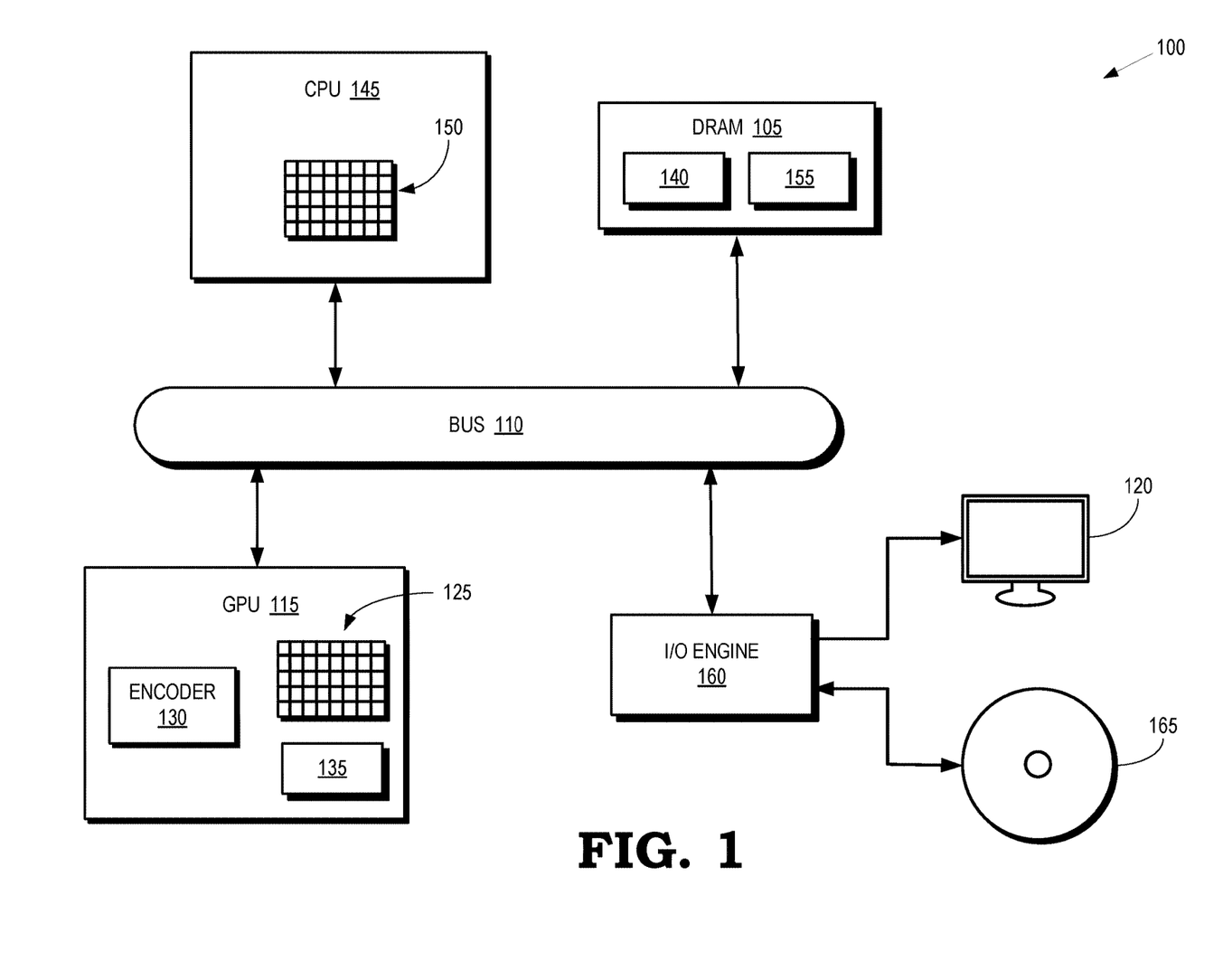
FIG. 1 is a block diagram of a processing system in accordance with some embodiments.

FIG. 1 is a block diagram of a processing system 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes one or more graphics processing units (GPUs) 115 that are configured to render images for presentation on a display 120. For example, the GPU 115 can render objects to produce values of pixels that are provided to the display 120, which uses the pixel values to display an image that represents the rendered objects. Some embodiments of the GPU 115 implement a graphics pipeline that generates video content based on a model of the scene that is provided to the GPU 115. The video content includes a sequence of frames that represent the video content at different times. For example, the graphics pipeline can generate frames at a rate of 40 frames per second (FPS), 60 FPS, and the like. The frames are subdivided into blocks of pixels such as 16 pixel×16 pixel, or other sizes that may change across the image. The GPU 115 implements multiple processing elements (also referred to as compute units) 125 that are configured to execute instructions concurrently or in parallel, e.g., to execute instructions that are used to implement a shader that produces values of pixels that are provided to the display 120.

The GPU 115 includes an encoder 130 that is used to encode the values of the pixels for transmission to the display 120, which implements a decoder to decode the pixel values to reconstruct the image for presentation. Pixels in the blocks are transformed and quantized during encoding. Some embodiments of the encoder 130 implement a discrete cosine transform (DCT) to calculate the frequency components of the pixels during the encoding process. The resulting frequency domain data are referred to as coefficients. The coefficients are quantized by dividing (or scaling) the coefficients for the blocks by a scaling matrix, which is defined by a quantization parameter. Some embodiments of the encoder 130 (or other components within the GPU 115) compress the encoded information for transmission to the display 120, which decompresses the encoded information.

The GPU 115 includes an internal (or on-chip) memory 135 that includes a local data store (LDS), as well as caches, registers, or buffers utilized by the processing elements 125. The internal memory 135 stores data structures that describe tasks executing on one or more of the processing elements 125. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 140 of instructions from a program code that is to be executed by the GPU 115 such as program code that represents a shader or other portion of a graphics pipeline that is used to generate video content for presentation on the display 120.

The processing system 100 also includes a central processing unit (CPU) 145 that is connected to the bus 110 and communicates with the GPU 115 and the memory 105 via the bus 110. In the illustrated embodiment, the CPU 145 implements multiple processing elements (also referred to as processor cores) 150 that are configured to execute instructions concurrently or in parallel. The CPU 145 can execute instructions such as program code 155 stored in the memory 105 and the CPU 145 can store information in the memory 105 such as the results of the executed instructions. The CPU 145 is also able to initiate graphics processing by issuing draw calls to the GPU 115.

An input/output (I/O) engine 160 handles input or output operations associated with the display 120, as well as other elements of the processing system 100 such as keyboards, mice, printers, external disks, and the like. The I/O engine 160 is coupled to the bus 110 so that the I/O engine 160 communicates with the memory 105, the GPU 115, or the CPU 145. In the illustrated embodiment, the I/O engine 160 is configured to read information stored on an external storage component 165, which is implemented using a non-transitory computer readable medium such as a compact disk (CD), a digital video disc (DVD), and the like. The I/O engine 160 can also write information to the external storage component 165, such as the results of processing by the GPU 115 or the CPU 145.

Encoding parameters such as quantization parameters or compression parameters are selected for portions of the frames, such as individual blocks, in a manner that balances the competing demands for high image quality and low consumption of bandwidth, e.g., bandwidth available to communicate information between the GPU 115 and the display 120 over the bus 110. The quantization parameter impacts both the quality and the bit rate of the encoded video. Thus, selecting appropriate quantization parameters for the blocks in a frame can (subjectively and objectively) improve compression efficiency and quality. The encoder 130 selects local quantization parameters for the blocks in the frames based on target bit rates or local metrics such as texture complexities, contrasts, motion, importance maps, and the like. In the case of undershooting, lower quantization parameters are selected and in the case of overshooting, higher quantization parameters are selected.

However, as discussed herein, encoding spatially or temporally adjacent blocks with different encoding parameters can result in undesirable visual artifacts. For example, encoding temporally adjacent blocks with different quantization parameters can cause shimmering or boiling artifacts. For another example, encoding spatially adjacent blocks with different quantization parameters can result in uneven treatment within a frame. As used herein, the term "adjacent" refers to blocks that are within a certain spatial or temporal distance from each other. For example, a set of neighboring blocks are considered (spatially) adjacent to a block if the neighboring blocks are in the same frame as the block and within a predetermined locality of the block. For another example, a block in a current frame is considered (temporally) adjacent to blocks in one or more previous frames if the block in the current frame is in the same position within the current frame as the blocks in the one or more previous frames.

At least in part to address the aforementioned drawbacks, the encoder 130 modifies the local encoding parameters for the blocks of video content in a frame based on one or more other local encoding parameters for one or more other blocks of video content that are adjacent to the blocks of video content in the frame. In some embodiments, the encoder 130 filters the local quantization parameters for the blocks in a current frame using local quantization parameters for spatially adjacent blocks in the current frame, local quantization parameters for temporally adjacent blocks in one or more previous frames, or a combination of spatially and temporally adjacent blocks. The encoder 130 that encodes the blocks in the frame based on the modified local encoding parameters. For example, the encoder 130 quantizes the blocks in the frame based on the modified local quantization parameters.

Figure 2:
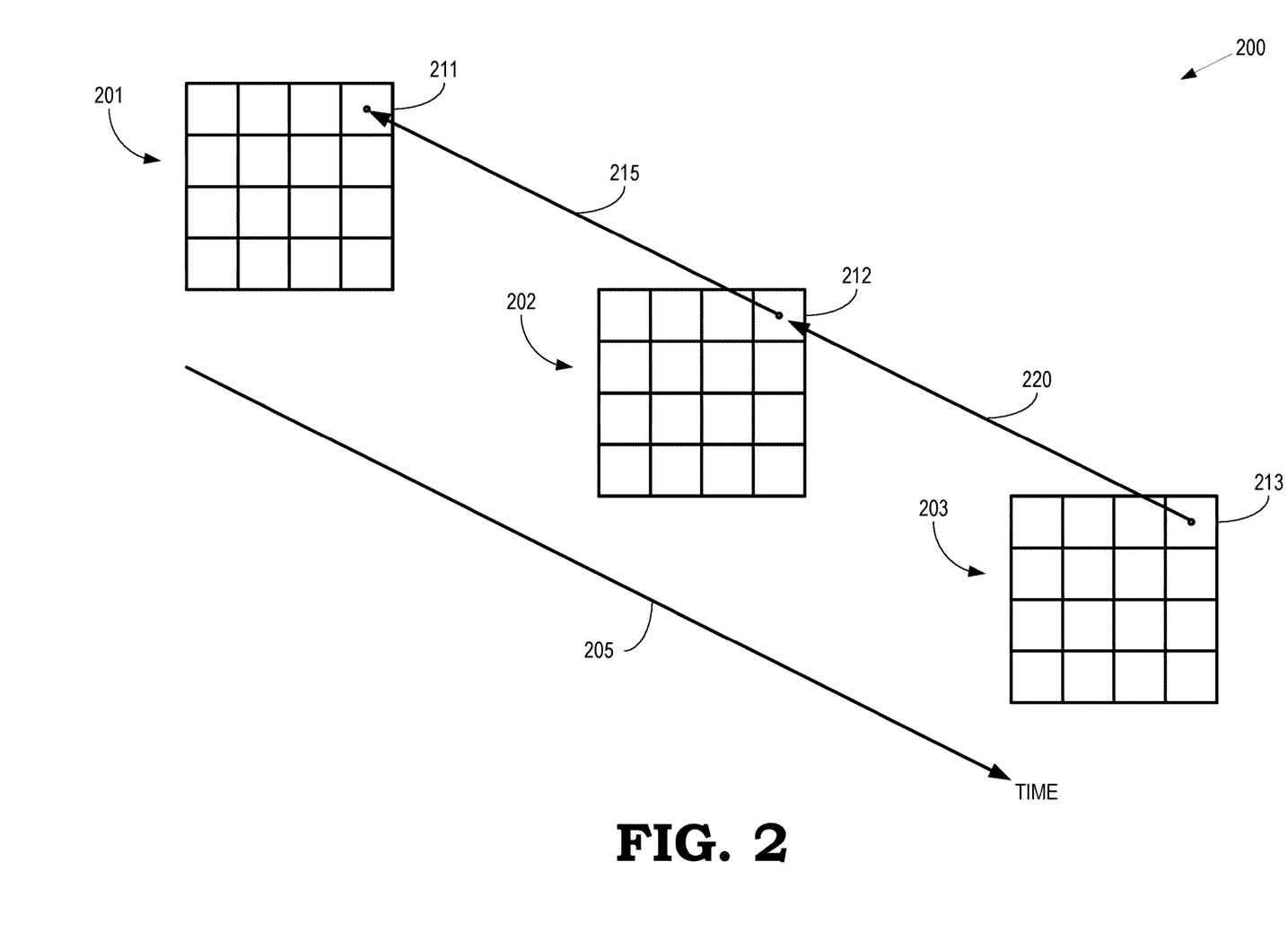
FIG. 2 is a block diagram of a sequence of frames that include temporally adjacent blocks according to some embodiments.

FIG. 2 is a block diagram of a sequence 200 of frames that include temporally adjacent blocks according to some embodiments. The sequence 200 is produced by some embodiments of the GPU 115 shown in FIG. 1. The sequence 200 includes frames 201, 202, 203, which are collectively referred to herein as "the frames 201-203." The frames 201-203 are sequential in time and time increases from upper left and lower right, as indicated by the arrow 205. The frame 203 is referred to herein as the current frame 203 and represents the most recently generated frame in the sequence 200. The frames 201, 202 are referred to as previous frames because they were generated prior to the current frame 203.

Blocks that are in the same relative location within the frames 201-203 are referred to as temporally adjacent blocks. In the illustrated embodiment, the blocks 211, 212, 213 (collectively referred to herein as "the blocks 211-213") are in the same relative locations within the corresponding frames 201-203. The blocks 211-213 are therefore temporally adjacent to each other. For example, the block 212 is temporally adjacent to the block 211 as indicated by the arrow 215 and the block 213 is temporally adjacent to the block 212 as indicated by the arrow 220. Consistent encoding parameters, such as quantization parameters or compression parameters, are therefore produced for the temporally adjacent blocks 211-213 by filtering the local encoding parameters of the blocks 211-213 based on the encoding parameters of the temporally adjacent blocks 211-213, as discussed in detail below.

Figure 3:
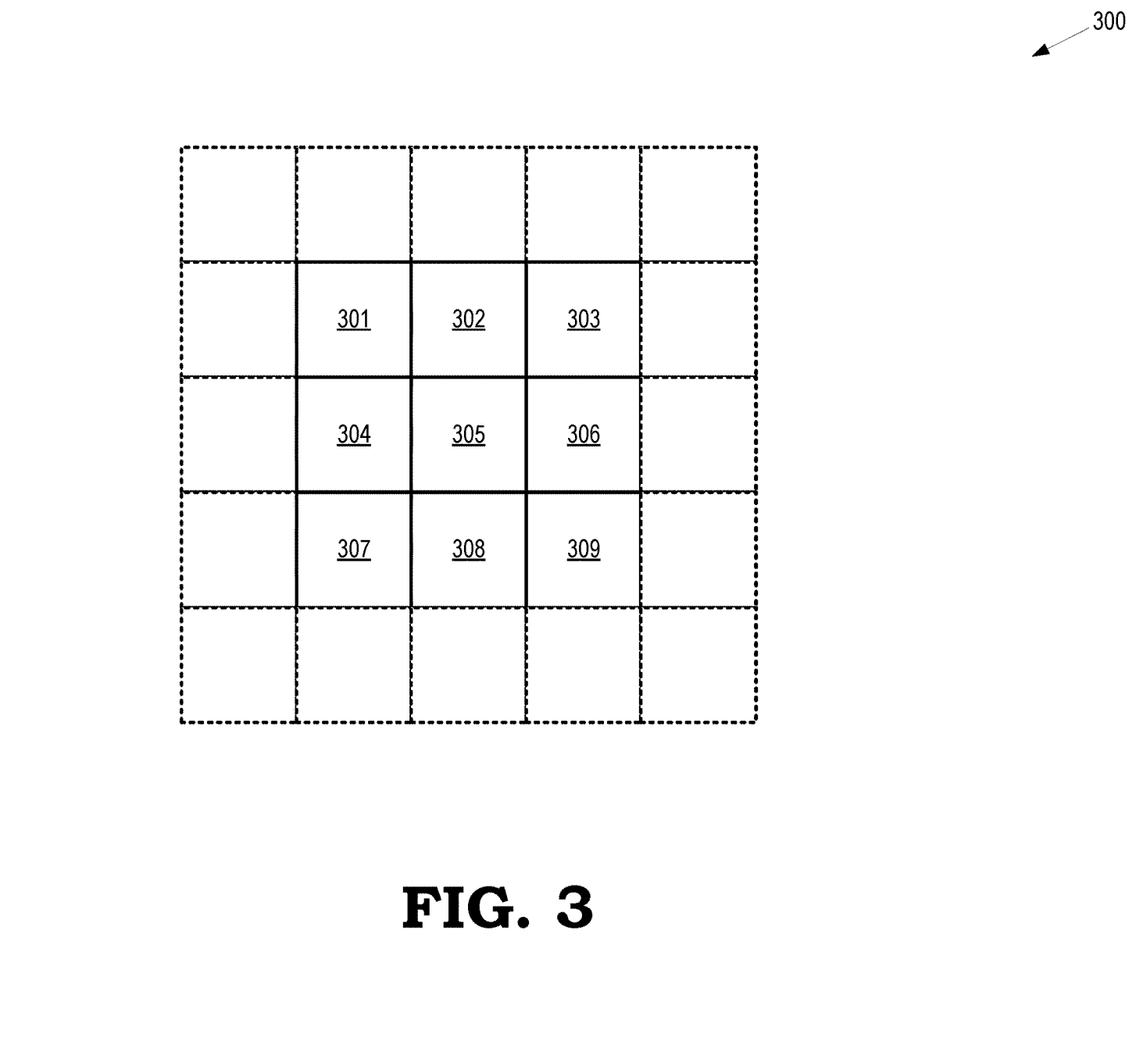
FIG. 3 is a block diagram of a frame that includes spatially adjacent blocks according to some embodiments.

FIG. 3 is a block diagram of a frame 300 that includes spatially adjacent blocks according to some embodiments. The frame 300 is produced by some embodiments of the GPU 115 shown in FIG. 1. The frame 300 is subdivided into blocks including the blocks 301, 302, 303, 304, 305, 306, 307, 308, 309, which are collectively referred to herein as "the blocks 301-309." In the illustrated embodiment, blocks in the frame 300 are considered spatially adjacent if they are within a locality that is defined to include nearest neighbor blocks. For example, the blocks 301, 302, 303, 304, 306, 307, 308, 309 are nearest neighbors of the block 305 and are therefore considered spatially adjacent to the block 305. Other localities are used to define spatially adjacent blocks in some embodiments of the frame 300. For example, a locality that includes nearest neighbors of the block 305 and nearest neighbors of the nearest neighbors of the block 305 can be used to define a larger number of spatially adjacent blocks.

Figure 4:
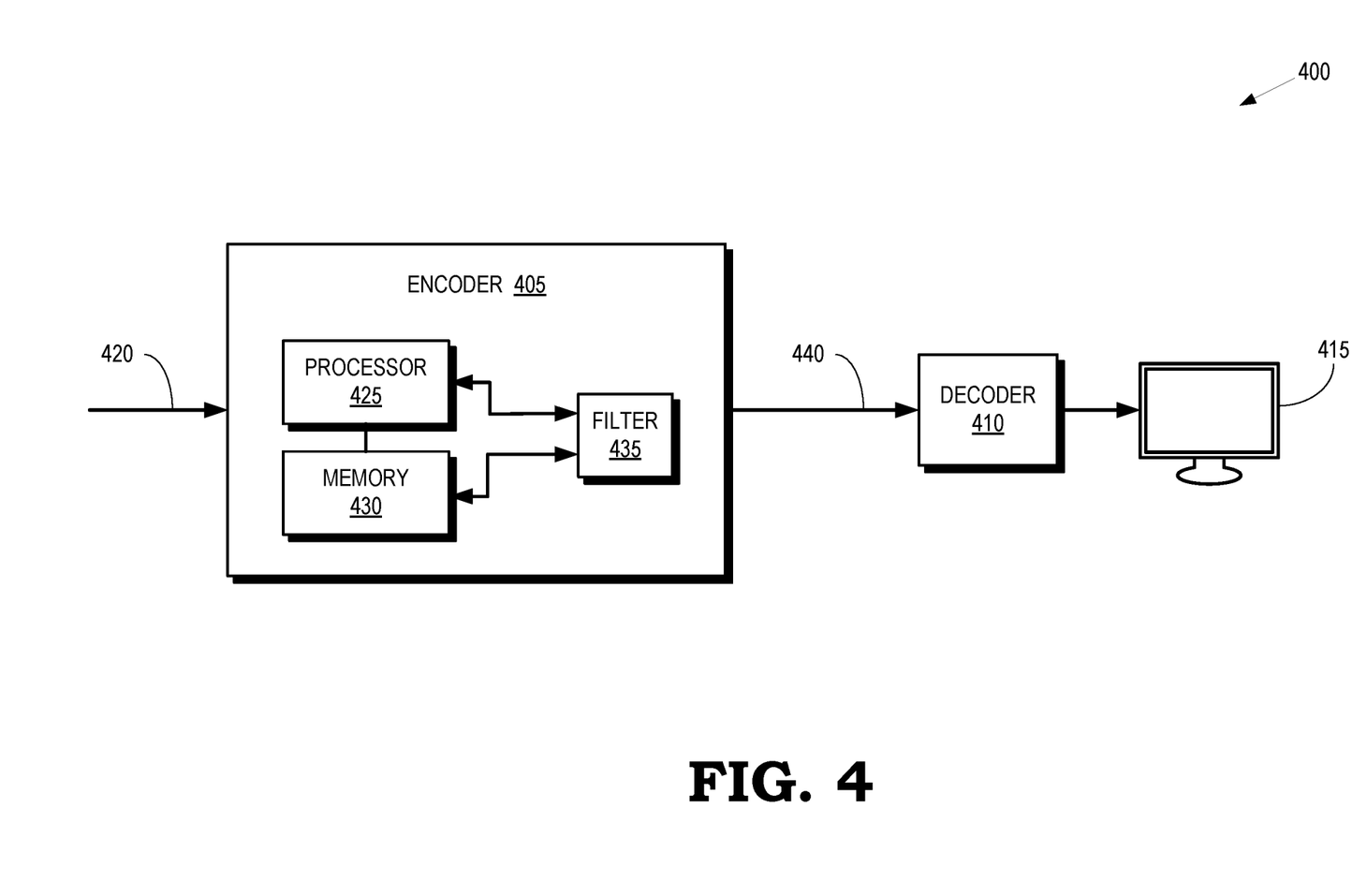
FIG. 4 is a block diagram of a processing system that includes an encoder to encode video content and a decoder to decode the video content for presentation on a display according to some embodiments.

FIG. 4 is a block diagram of a processing system 400 that includes an encoder 405 to encode video content and a decoder 410 to decode the video content for presentation on a display 415 according to some embodiments. The processing system 400 represents portions of some embodiments of the processing system 100 shown in FIG. 1. The encoder 405 receives video content 420 such as sequences of frames that are subdivided into blocks. The video content 420 is generated by a processing unit such as the GPU 115 shown in FIG. 1. The encoder 405 includes a processor 425, a memory 430, and a filter 435, which are configured to generate an encoded bitstream 440 for transmission to the decoder 410.

The processor 425 generates local encoding parameters for the blocks in the frames based on local metrics such as a target bit rate, a texture complexity, a contrast, an indicator of motion in the video content, and an importance map. The local metrics are provided to the encoder 405 and stored in the memory 430. The processor 425 accesses values of the local metrics from the memory 430. The processor 425 can also store values of the local encoding parameters for a current frame or one or more previous frames in the memory 430. The processor 425 provides the local encoding parameters for the blocks in the frame to the filter 435, which modifies the local encoding parameters to generate temporally or spatially consistent encoding parameters. The filter 435 provides the modified encoding parameters to the processor 425, which uses the modified encoding parameters to encode the video content 420 and generate the encoded bitstream 440.

Some embodiments of the filter 435 filters the local encoding parameters to provide temporal consistency, e.g., by modifying the local encoding parameters based on (local or modified) encoding parameters for temporally adjacent blocks in prior frames. For example, temporal filtering of a quantization parameter is represented by defining $QP_{x,y,t}$ as a local quantization parameter defined using local metrics for the block at location (x, y) in a frame associated with the time, t. The filter 435 performs the temporal filtering based on a filter constant, $\alpha$. The modified or filtered quantization parameter (W) is defined as an infinite impulse response (IIR) filter:

$$W_{x,y,t} = (1-\alpha)*W_{x,y,t-1} + \alpha*QP_{x,y,t}$$

Although the IIR filter defined above is limited to one frame of temporal adjacency, some embodiments of the filter 435 extend the temporal adjacency to more than a single frame. Some embodiments of the filter 435 also consider the effect of a scene change and only consider frames that use the same scene in the filtering process. Furthermore, some embodiments of the filter 435 implement more complex filters including additional filter constants or adaptively selected filter constants. For example, the filter constants can be selected adaptively based on the complexity of the scene, complexity of the content, or using empirical selection criteria. The filter 435 can also implement other types of filtering including finite impulse response (FIR) filtering, 2-tap filtering, 4-tap filtering, and the like.

Some embodiments of the filter 435 modify the local encoding parameters to provide spatial consistency, e.g., by modifying the local encoding parameters based on local encoding parameters for spatially adjacent blocks in the same frame. The filter 435 implements a spatial blurring filter, S, or other type of filter such as a Gaussian blurring filter, which is used to mix encoding parameters from adjacent blocks to increase consistency between the encoding parameters and the adjacent blocks. For example, a blurring filter can consist of $(2r+1)^2$ coefficients that are denoted $C_{i,j}$. The value of the parameter r and the number of coefficients is determined based on a locality for the filter. A spatially filtered encoding parameter is determined based on local encoding parameters, such as a local quantization parameter $QP_{x,y,t}$, using the spatial filter:

$$S_{x,y,t} = \sum_{i=-r}^{r} \sum_{j=-r}^{r} C_{i+r,j+r} * QP_{x+i,y+i,t}$$

Some embodiments of the filter 435 apply different weights to the encoding parameters of different spatially adjacent blocks. The values of the weights can be determined based on their relative importance, relative proximity to the block under consideration, and the like. For example, the filter 435 assigned to a higher weight to the blocks that are closer to the block under consideration. Some embodiments of the filter 435 apply other techniques to modify the local encoding parameters to increase consistency among the encoding parameters. For example, the filter 435 can implement a rule-based method, a method based on transfer functions, a method based on a learning engine or a neural network, and the like.

Some embodiments of the filter 435 modify the local encoding parameters to provide spatial and temporal consistency, e.g., by modifying the local encoding parameters based on local encoding parameters for spatially adjacent blocks in the same frame and (local or modified) encoding parameters for temporally adjacent blocks in previous frames. The spatio-temporally filtered encoding parameter, F, can be calculated as:

$$F_{x,y,t} = \sum_{i=-r}^{r} \sum_{j=-r}^{r} C_{i+r,j+r} * W_{x+i,y+i,t}$$

$$W_{x,y,t} = (1-\alpha) * W_{x,y,t-1} + \alpha * QP_{x,y,t}$$

As discussed above, some embodiments of the filter 435 use other techniques for spatially or temporally filtering the encoding parameter. In the illustrated embodiment, the filter 435 applies the temporal filter first and then subsequently processes the temporally filtered values using a spatial filter. For each value of the filtered encoding parameter, F, the $(2r+1)^2$ values of the encoding parameter are filtered (e.g., using IIR filtering) using $(2r+1)^2$ previously filtered values, which results in $r^2$ temporally filtered values. The temporally filtered values are weighted with $(2r+1)^2$ coefficients denoted $C_{i,j}$. However, some embodiments of the filter 435 apply the spatial filter first and then subsequently processes spatially filtered values using a temporal filter. Furthermore, the filter 435 can apply other filters including multi-order IIR filters that have different weights for the t, t−1, t−2, . . . components.

Figure 5:
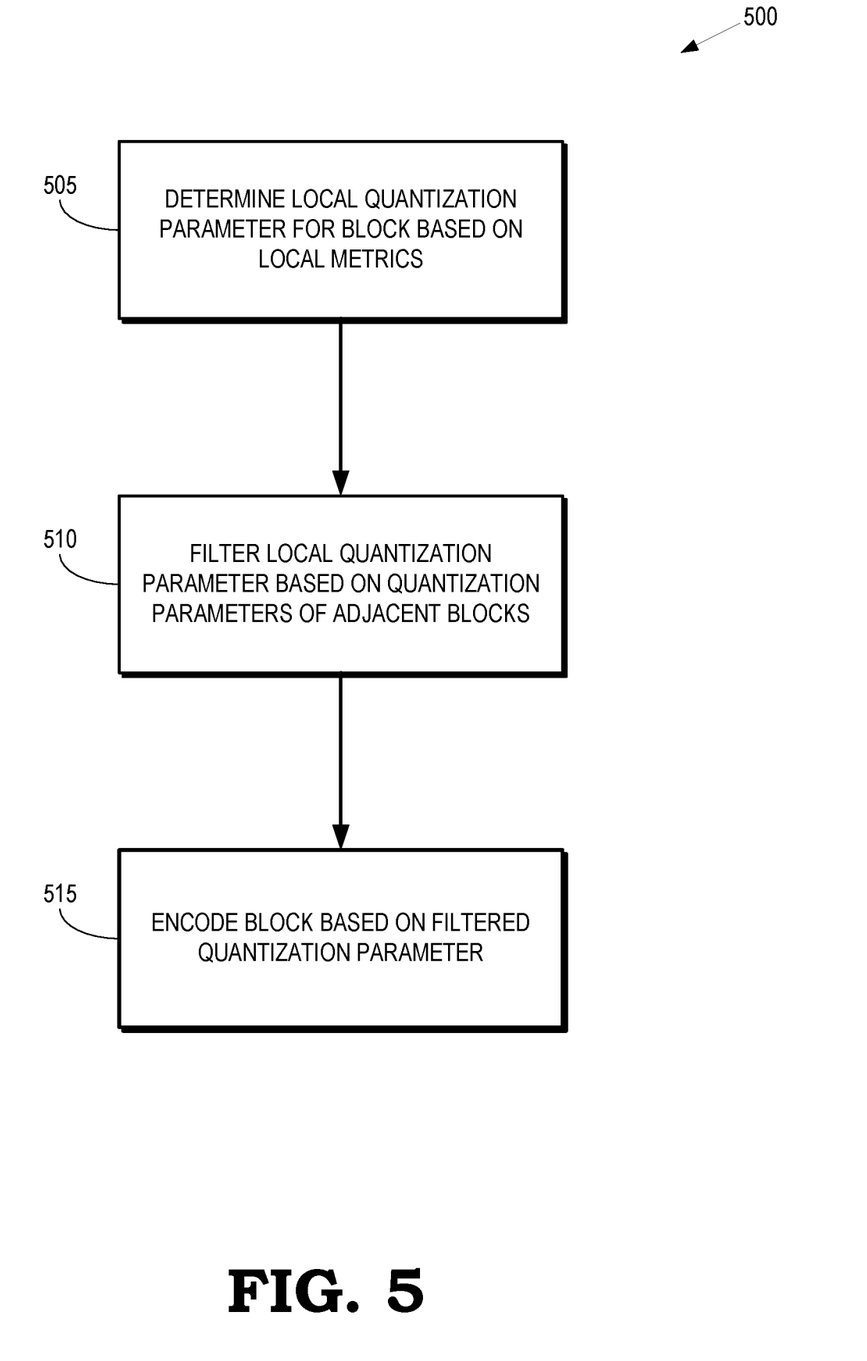
FIG. 5 is a flow diagram of a method of filtering encoding parameters to provide consistency between parameters used to encode adjacent blocks in a frame of video content according to some embodiments.

FIG. 5 is a flow diagram of a method 500 of filtering encoding parameters to provide consistency between parameters used to encode adjacent blocks in a frame of video content according to some embodiments. The method 500 is implemented in some embodiments of the processing system 100 shown in FIG. 1 and the processing system 400 shown in FIG. 4.

At block 505, a processor determines a local quantization parameter for a block in a current frame of video content based on local metrics. Examples of local metrics include, but are not limited to, a target bit rate, a texture complexity, a contrast, an indicator of motion in the video content, and an importance map.

At block 510, a filter is used to filter the local quantization parameters based on quantization parameters of adjacent blocks. The adjacent blocks are either spatially adjacent or temporally adjacent to the current block. Some embodiments of the filter apply spatial filtering, temporally filtering, or a combination thereof.

At block 515, the processor encodes the block based on the filtered quantization parameters. The encoded block is then transmitted to a display for presentation to a viewer. The display implements or has access to a decoder that decodes the encoded block to reconstruct the block and associated frame.

Figure 6:
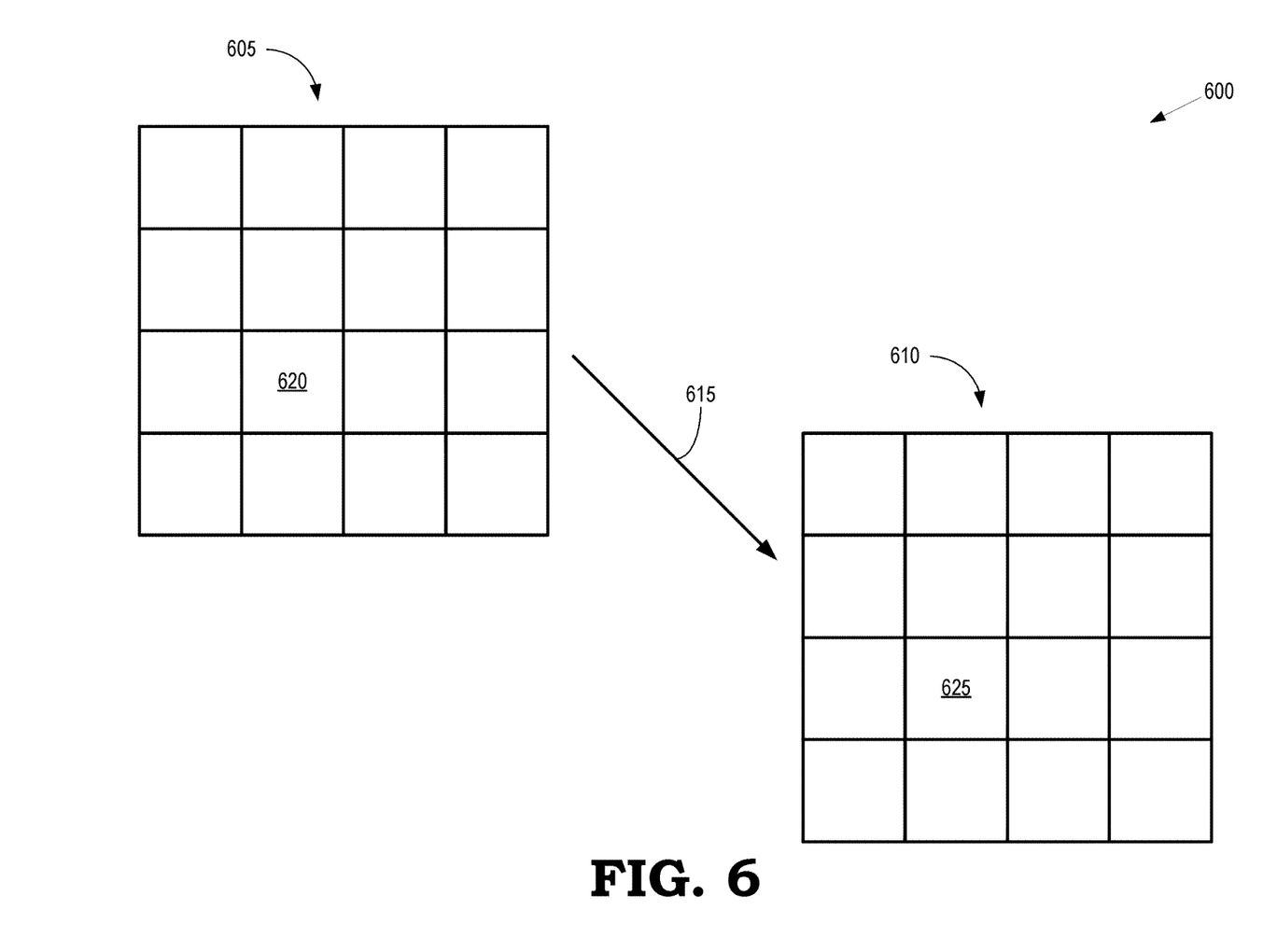
FIG. 6 is a block diagram of a sequence of frames that include blocks that are encoded using different encoding types according to some embodiments.

FIG. 6 is a block diagram of a sequence 600 of frames 605, 610 that include blocks that are encoded using different encoding types according to some embodiments. The sequence 600 is produced by some embodiments of the GPU 115 shown in FIG. 1. The frames 605, 610 are sequential in time and time increases from upper left and lower right, as indicated by the arrow 615. The frames 605, 610 include blocks 620, 625, respectively, which are encoded using different encoding types. Examples of different encoding types include intra coding (I) that encodes pixels in a block based on correlations among pixels within the frame that includes the block, predictive coding (P) that encodes pixels in a frame based in part on values of pixels in prior frames, or bidirectional (B) encoding that encodes pixels in a frame based in part on values of pixels in both prior and subsequent frames. In the illustrated embodiment, the block 620 is encoded using the type I coding and the block 625 is encoded using the type P encoding.

Using the same encoding parameters for the blocks 620, 625 does not typically result in the same image quality or number of bits because the blocks 620, 625 are encoded using different types of encoding. Thus, consistency between the blocks 620, 625 is not guaranteed by using the same or similar encoding parameters, such as quantization parameters, for the blocks 620, 625. In some embodiments, the quantization parameters are therefore determined based on the encoding type used to encode the blocks 620, 625. For example, one type of block can be assigned higher or lower quantization parameters relative to other types of blocks to provide consistency between the blocks. The encoding type for a block is determined during the encode process for blocks that are in the process of being encoded. Modification of the encoding parameters based on the encoding type is performed by applying a transfer function to values that are input to a filter in the encoder (e.g., the filter 435 shown in FIG. 4), output values produced by the filter, or a combination thereof. Example transfer functions include linear functions, higher order functions, lookup tables (LUT), and the like. Furthermore, although FIG. 6 illustrates temporal filtering, transfer functions are also applied to spatial filtering or spatio-temporal filtering in some embodiments.

Figure 7:
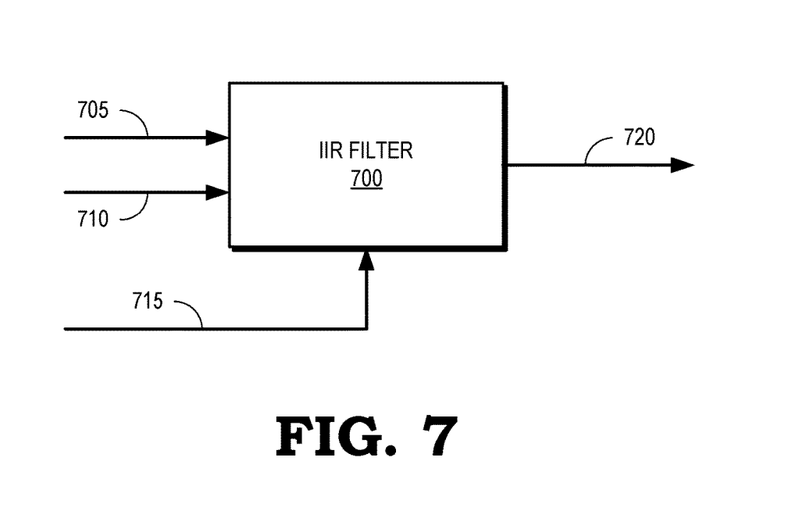
FIG. 7 is a block diagram of an infinite impulse response (IIR) filter that does not implement a transfer function to modify the filtering based on an encoding type according to some embodiments.

FIG. 7 is a block diagram of an IIR filter 700 that does not implement a transfer function to modify the filtering based on an encoding type according to some embodiments. The IIR filter 700 is used to implement some embodiments of the filter 435 shown in FIG. 4. Although the filter 700 is implemented as an IIR filter in the illustrated embodiment, other embodiments are implemented as other types of filters such as fire filters, nonlinear filters, multi-tab filters, and the like. The inputs to the IIR filter 700 include a past value 705 of a parameter such as a quantization parameter and the current value 710 of the parameter that is determined using local metrics, as discussed herein. The IIR filter 700 also receives a filter strength 715 and produces an output value 720 that represents a value of the parameter that is used in the encoding process. In the illustrated embodiment, the output value 720 is determined as:

Output=Past+α×(Current−Past)

However, other filtering processes, such as higher order filters, are implemented in other embodiments of the IIR filter.

Figure 8:
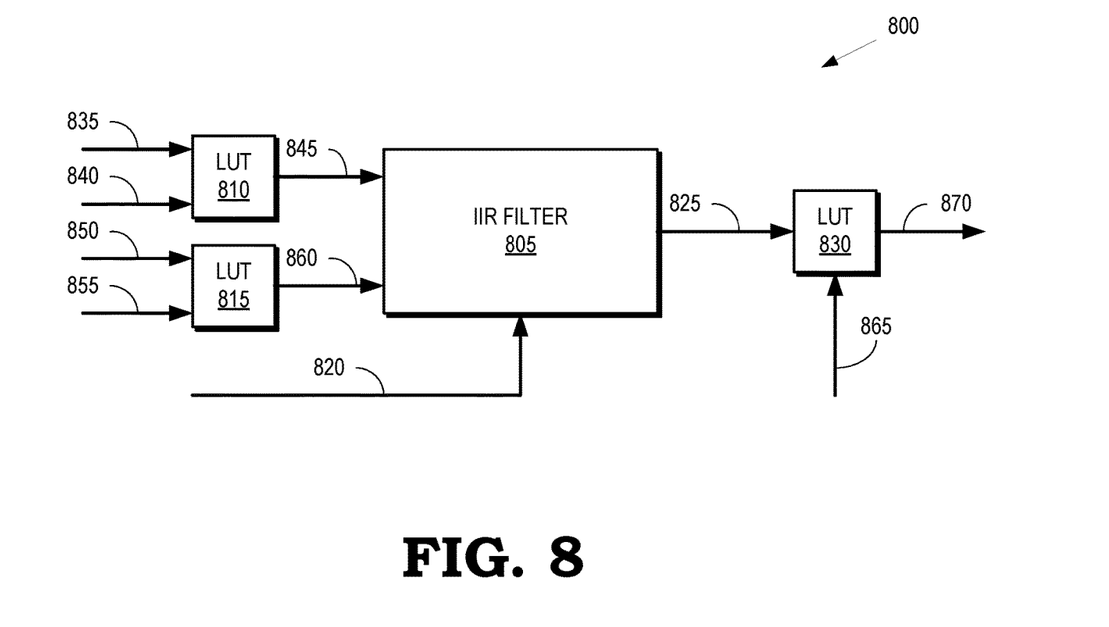
FIG. 8 is a block diagram of filtering system that is sensitive to the encoding type of the blocks that are filtered in the filtering system according to some embodiments.

FIG. 8 is a block diagram of filtering system 800 that is sensitive to the encoding type of the blocks that are filtered in the filtering system 800 according to some embodiments. The filtering system 800 is used to implement some embodiments of the filter 435 shown in FIG. 4. The filtering system 800 includes an IIR filter 805 that receives inputs produced by the transfer functions 810, 815, which are implemented as LUTs in the illustrated embodiment. The IIR filter 805 also receives a filter strength 820 and generates an output value 825, which is provided to a transfer function 830 that is implemented as an LUT in the illustrated embodiment. Although the transfer functions 810, 815, 830 are implemented as LUTs in the illustrated embodiment, some embodiments of the transfer functions 810, 815, 830 are implemented as linear functions, higher order functions, and the like.

The LUT 810 receives a past value 835 of the encoding parameter and an indication 840 of the type of encoding used to encode the block that is associated with the past value 835. For example, the indication 840 can indicate that the block is an I type block, a P type block, or a B type block. The LUT 810 determines a transfer function based on the type identified by the indication 840 and applies the transfer function to the past value 835. The modified past value 845 is then provided as an input to the BR filter 805. The LUT 815 receives a current value 850 of the encoding parameter and an indication 855 of the type of encoding used to encode the block that is associated with the current value 850. For example, the indication 855 can indicate that the block is an I type block, a P type block, or a B type block. The LUT 815 determines a transfer function based on the type identified by the indication 855 and applies the transfer function to the current value 850. The modified current value 860 is then provided as an input to the BR filter 805.

The IIR filter 805 filters the modified past value 845 and the modified current value 860, as discussed herein, to generate the output value 825, which is provided to the LUT 830. In the illustrated embodiment, an indication 865 of the current block type is provided to the LUT 830 which applies an inverse transform from a normalized space to an un-normalized space to produce an encoding parameter value 870 that is used to encode the current block. For example, the LUT 830 can generate a value of a quantization parameter.

Figure 9:
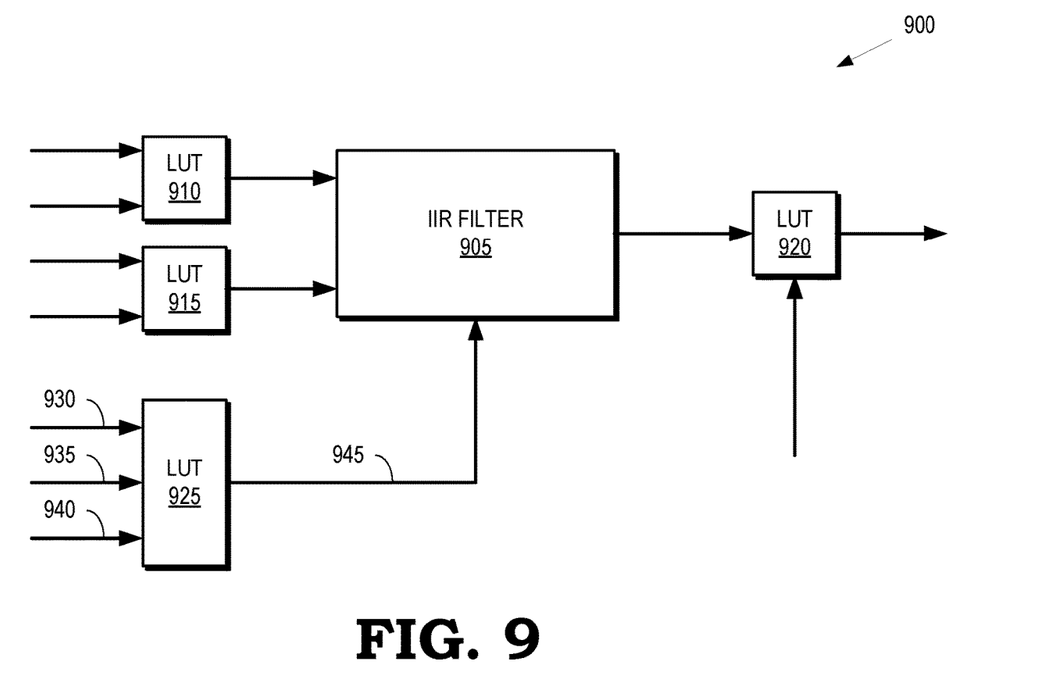
FIG. 9 is a block diagram of filtering system that is sensitive to the encoding type of the blocks that are filtered in the filtering system according to some embodiments.

FIG. 9 is a block diagram of filtering system 900 that is sensitive to the encoding type of the blocks that are filtered in the filtering system 900 according to some embodiments. The filtering system 900 is used to implement some embodiments of the filter 435 shown in FIG. 4. The filtering system 900 includes an BR filter 905, and LUTs 910, 915, 920 that operate in the same or similar manner as the IIR filter 805 and the LUTs 810, 815, 830 shown in FIG. 8.

The filtering system 900 differs from the filtering system 800 shown in FIG. 8 because the filtering system 900 includes an additional transfer function, which is implemented as a LUT 925 in the illustrated embodiment. The LUT 925 modifies a filtering parameter based on encoding types of the blocks that are used in the encoding process. For example, the LUT 925 can modify the filtering parameter in response to the encoding type changing from block to block.

In the illustrated embodiment, the LUT 925 receives a filter parameter 930, an indicator 935 of the type of the previous block, and an indicator 940 of the type of the current block. The LUT 925 modifies the filter parameter 930 based on the indicators 935, 940 to generate a modified filter parameter 945 that is provided to the IIR filter 905.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
calculating, at an encoder, a first local encoding parameter for a first block of video content based on at least one local metric, the first block of video content comprising a first plurality of pixels;
modifying, at the encoder, the first local encoding parameter based on at least one second local encoding parameter for at least one second block of video content that is spatially adjacent to the first block of video content, the second block of video content comprising a second plurality of pixels different from the first plurality of pixels; and
encoding, at the encoder, the first block using the modified first local encoding parameter.

2. The method of claim 1, wherein the first local encoding parameter and the at least one second local encoding parameter are quantization parameters used to quantize values of pixels in the corresponding first and at least one second block or compression parameters used to compress values of the pixels in the corresponding first and at least one second blocks.

3. The method of claim 1, wherein the at least one local metric comprises at least one of a target bit rate, a texture complexity, a contrast, an indicator of motion in the video content, and an importance map.

4. The method of claim 1, wherein the first block is in a first frame, wherein the at least one second block is in at least one second frame prior to the first frame, and wherein modifying the first local encoding parameter based on the at least one second local encoding parameter comprises temporally filtering the first local encoding parameter based on the at least one second local encoding parameter.

5. The method of claim 4, wherein temporally filtering the first local encoding parameter comprises applying at least one transfer function to at least one of an input to a filter or an output of the filter, and wherein the at least one transfer function is determined by at least one of an encoding type of encoding applied to the first block or an encoding type of encoding applied to the second block.

6. The method of claim 1, wherein the first block and the at least one second block are spatially adjacent to each other in a first frame, and wherein modifying the first local encoding parameter based on the at least one second local encoding parameter comprises spatially filtering the first local encoding parameter based on the at least one second local encoding parameter.

7. The method of claim 6, wherein spatially filtering the first local encoding parameter comprises applying at least one of a box filter and a Gaussian blur filter to the first local encoding parameter and the at least one second local encoding parameter within a predetermined locality about the first local encoding parameter.

8. The method of claim 1, wherein modifying the first local encoding parameter based on the at least one second local encoding parameter comprises spatially and tempo-rally filtering the first local encoding parameter based on the at least one second local encoding parameter.

9. The method of claim 1, further comprising:
selecting at least one of spatial filtering or temporal filtering in response to a scene change or a change in characteristics of images including the first and second blocks; and
modifying the first local encoding parameter using the selected at least one of spatial filtering or temporal filtering based on the at least one second local encoding parameter.

10. An apparatus comprising:
an encoder configured to calculate a first local encoding parameter for a first block of video content based on at least one local metric, the first block of video content comprising a first plurality of pixels;
store at least one second local encoding parameter for at least one second block of video content that is spatially adjacent to the first block of video content, the second block of video content comprising a second plurality of pixels different from the first plurality of pixels; and
modify the first local encoding parameter based on the at least one second local encoding parameter and encode the first block using the modified first local encoding parameter.

11. The apparatus of claim 10, wherein the first local encoding parameter and the at least one second local encoding parameter are quantization parameters used to quantize values of pixels in the corresponding first and at least one second block or compression parameters used to compress values of the pixels in the corresponding first and at least one second blocks.

12. The apparatus of claim 10, wherein the at least one local metric comprises at least one of a target bit rate, a texture complexity, a contrast, an indicator of motion in the video content, and an importance map.

13. The apparatus of claim 10, wherein the first block is in a first frame, wherein the at least one second block is in at least one second frame prior to the first frame, and wherein the encoder is configured to temporally filter the first local encoding parameter based on the at least one second local encoding parameter.

14. The apparatus of claim 13, further comprising:
at least one transfer function to modify at least one of an input to a filter of the encoder or an output of the filter of the encoder, and wherein the at least one transfer function is determined by at least one of an encoding type of encoding applied to the first block or an encoding type of encoding applied to the second block.

15. The apparatus of claim 10, wherein the first block and the at least one second block are spatially adjacent to each other in a first frame, and wherein the encoder is configured to spatially filter the first local encoding parameter based on the at least one second local encoding parameter.

16. The apparatus of claim 15, wherein the encoder is configured to apply at least one of a box filter and a Gaussian blur filter to the first local encoding parameter and the at least one second local encoding parameter within a predetermined locality about the first local encoding parameter.

17. The apparatus of claim 10, wherein the encoder is configured to spatially and temporally filter the first local encoding parameter based on the at least one second local encoding parameter.

18. The apparatus of claim 10, wherein the processor is configured to:
- select at least one of spatial filtering or temporal filtering in response to a scene change or a change in characteristics of images including the first and second blocks; and
- modify the first local encoding parameter using the selected at least one of spatial filtering or temporal filtering based on the at least one second local encoding parameter.

19. A graphics processing unit comprising:
- a plurality of compute elements configured to generate a sequence of frames representing video content, wherein the frames comprise a plurality of blocks; and
- an encoder configured to:
  - calculate a plurality of local encoding parameters based on local metrics for the plurality of blocks; and
  - receive inputs produced by at least one transfer function to filter the plurality of local encoding parameters based on local encoding parameters calculated for spatially adjacent blocks in the video content.

20. The graphics processing unit of claim 19, wherein the encoder is configured to filter the plurality of local encoding parameters using at least one of temporal filtering and spatial filtering.

* * * * *

UNITED STATES PATENT AND TRADEMARK OFFICE
CERTIFICATE OF CORRECTION

| | |
|---|---|
| PATENT NO. | : 11,930,168 B2 |
| APPLICATION NO. | : 16/147052 |
| DATED | : March 12, 2024 |
| INVENTOR(S) | : Mehdi Saeedi and Boris Ivanovic |

It is certified that error appears in the above-identified patent and that said Letters Patent is hereby corrected as shown below:

In the Claims

At Column 13 Line 1, please correct "wherein the processor is" to be --wherein the encoder is--

Signed and Sealed this
Twentieth Day of August, 2024

Katherine Kelly Vidal
*Director of the United States Patent and Trademark Office*